FIG. I.
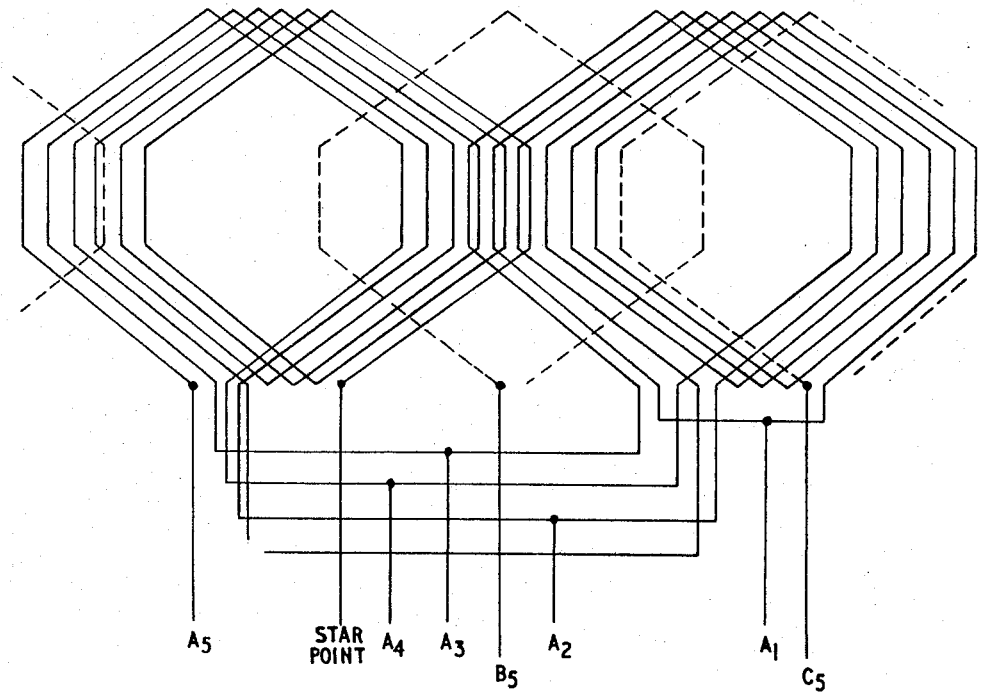
FIG. 2.
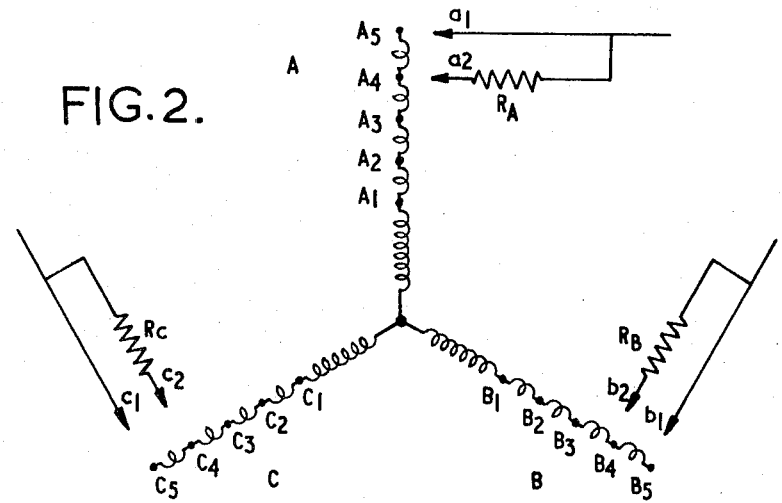

United States Patent Office 3,302,087
Patented Jan. 31, 1967

3,302,087
CONTROLLED SPEED INDUCTION MOTORS
Gordon Hindle Rawcliffe, Clifton, Bristol, and William Fong, Bristol, England, assignors to National Research Development Corporation, London, England, a corporation of Great Britain
Filed July 5, 1963, Ser. No. 292,838
Claims priority, application Great Britain, July 10, 1962, 26,522/62
3 Claims. (Cl. 318—225)

This invention relates to induction motors and more particularly to circuit and coil arrangements thereof which enable the speed of the motor to be controlled.

It is known that the slope of the initial section of the speed-torque curve of an induction motor depends on two factors: the resistance of the rotor and the applied voltage. It is further known that the speed at which the pull-out torque occurs depends on the rotor resistance, though the magnitude of this torque is independent of the rotor resistance.

Thus a limited reduction in the speed of a motor on load can be obtained by regulating the applied voltage, but the acceptable practical limit to this method of control is soon reached when the falling torque becomes equal to the pull-out torque at the reduced voltage. The range of possible speed control by this method can be increased by using a rotor of higher than normal resistance though this will necessarily reduce the maximum power output of the motor owing amongst other things to overheating. Forced ventilation could alleviate this disadvantage but nevertheless the use of a voltage regulator in this manner is inefficient and expensive.

It has previously been generally thought that an electrical machine with part of each phase winding out of circuit would always exhibit a number of characteristic and undesirable faults, such as vibration, noise, over-heating, crawling etc. Arrangements for specific purposes have been proposed involving the use of divided coils in some or all of the armature slots but it was not thought possible to operate a machine satisfactorily with some complete coils wholly out of circuit. It has now been established that the windings on a polyphase armature can be so disposed that the machine can operate satisfactorily with selected whole coils of each phase winding in or out of circuit. This implies that each of the phase windings of an induction motor can be made to behave as an auto-transformer for self-regulation of the applied voltage.

The selected coils to be eliminated from each winding and the coil-pitch of the winding can be so chosen that the magneto-motive force waveform is still of satisfactory shape after each removal of selected coils of the winding to control the speed. The coil-pitch of the winding is a critical factor as will be made clear hereinafter.

According to the invention a poly-phase electrical inductance motor comprises a plurality of like phase windings, each phase winding being composed of coils arranged to provide a number of pole-groups and each coil having a pitch of substantially five-sixths of full pitch, and, in the case of each phase winding, successively connected coils of the phase winding being chosen from corresponding positions in the pole groups in sequence commencing from corresponding ends of the pole groups; tapping connections to junctions between at least some of said successively connected coils; and switching means from external supply terminals arranged simultaneously to make contact with corresponding selected tapping connections in each phase winding and thereby to enable like coils in each phase winding to be excluded to effect increase in speed of the motor.

The choice of coil-pitch at five-sixths full pitch is made so that the undesirable fifth and seventh harmonics in the magneto-motive force waveform are both reduced to substantially low amplitudes, so that their resultant undesirable effects are greatly reduced. If in a particular motor the coil-pitch cannot be made exactly five-sixths full pitch it is preferable to make it slightly larger, rather than smaller, since making it smaller will tend to increase the seventh harmonic, which acts in the same sense as the fundamental, and reduce the fifth harmonic which is in opposition thereto.

In carrying out the invention the number of tapping points which may be established in each winding can readily be made sufficiently great to make available a near approach to continuous speed regulation over the available range of speeds. In practice, the range would generally be from about 15% below full speed up to the full design speed of the motor.

The main factor limiting the range of speed control obtainable in a motor designed according to the invention is that when the motor is running at top design speed the full supply power will be passing through only the fraction of the complete winding that is left untapped, which must therefore of course be capable of carrying this load.

According to a feature of the invention, in order that the tapping of the winding may be changed while the motor is running on load, said switching means includes a limiting resistance associated with each supply phase lead and means for bringing said limiting resistance into circuit intermediately between changes of tapping connection.

In order that the present invention may be readily carried into effect, a particular embodiment thereof will be described by way of example only, with reference to the accompanying drawings.

FIGURE 1 illustrates in diagrammatic form the details of the slot winding pattern of one of the three phases and the disposition of the tapped coils in a 2-pole 3-phase 36-slot induction motor.

FIGURE 2 illustrates diagrammatically the operation of tap-changing switching means suitable for the motor of FIGURE 1.

Referring to FIGURE 1 the three phases of this motor are denoted by the letters A, B and C and each is wound and tapped in an exactly similar pattern. The numbers across the top of the figure refer to the slot numbers of the motor. The number of tapping points $A_1, A_2, A_3 \ldots B_1, B_2, B_3 \ldots C_1, C_2, C_3 \ldots$ that can readily be established in each phase is equal to the number of winding coils in each phase. In the example of FIGURE 1 of a 2-pole 3-phase 36-slot machine there will therefore be 12 coils per phase, and 12 tapping points could be established in each phase. However it is not feasible to use all of them. To cover one half of each phase winding 7 tapping points would be used, but the embodiment of FIGURE 1 shows a third of the winding used for the speed control, each phase winding having 5 tapping points $A_1, A_2, A_3, A_4$ and $A_5$; $B_1, B_2, B_3, B_4$ and $B_5$; and $C_1, C_2, C_3, C_4$ and $C_5$ respectively. Each tapping point lies between two coils and controls one twelfth of a phase winding, thus leaving two-thirds of the winding untapped. The tapping points are numbered outwards from the star point along each phase winding. Thus with all the coils in circuit the appropriate supply phases will be connected to tapping points $A_5, B_5$ and $C_5$. In this condition the motor will be running at its lowest speed. When it is desired to increase the speed by one step the tap-changing equipment is operated as explained hereinafter to connect the supply phases to tapping points $A_4, B_4$ and $C_4$, thus removing from circuit the coils in slots 1, 13 and 25. The next step up in speed will similarly involve connecting the supply phases to tapping points $A_3, B_3$ and $C_3$, thus removing from circuit the coils in slots 19, 31 and 7. Following each step up of speed it will be seen that the order of the coils cut out of circuit from phase A is from the slots numbered 1, 19, 2 and 20; in phase B from slots 13, 31, 14 and 32, and in phase C from slots 25, 7, 26 and 8. Thus stated as a general rule, the coils of each phase are so arranged in the slots that progressive cutting out of coils from one end of a phase winding results in coils being removed alternately from the corresponding ends of the two pole groups in each phase. In a multi-pole motor the arrangement would be such that the coils were removed successively from the corresponding ends of each group according to a symmetrical pattern. FIGURE 1 shows the tapping points $A_1 \ldots A_5$ positioned so as to enable the coils in slots 1, 19, 2 and 20 to be removed, but by the symmetry of the motor they could of course be alternatively arranged to successively cut out the coils in slots 6, 24, 5, and 23 from the other ends of the two groups in phase A. Phases B and C would then also have to be treated in the same sense to preserve the fundamental condition that for each coil removed from a certain position in a certain group, other coils must be simultaneously removed from corresponding positions in the corresponding groups of each phase. The coil pitch of the motor in FIGURE 1 is readily seen to be $15/18$ or $5/6$ of full pitch, which as explained above is the desirable value.

The winding is designed so that full flux and full power output at the top speed required are obtained with only the untapped two-thirds of each phase-winding in circuit. Referring now to FIG. 2 there are shown switching means comprising leads $a_1$, $a_2$, $b_1$, $b_2$, $c_1$, $c_2$, and limiting resistors $Ra$, $Rb$, and $Rc$. The supply lead $a_1$ is connected to tapping point $A_1$, lead $b_1$ to $B_1$ and lead $c_1$ to $C_1$; the notation corresponding exactly to that in FIGURE 1. When it is desired to lower the speed, the additional coils are progressively inserted into circuit causing the flux to be reduced and the speed for a given load to fall. On a typical fan-type load a drop of up to about 15% in speed may thus be obtained before danger of pull out arises. To insert extra coils in circuit when under load, starting from the position when the leads $a_1$, $b_1$, $c_1$ are connected to taps $A_1$, $B_1$, $C_1$, the procedure is as follows:

Considering only phase A, first connect lead $a_2$ to the next tapping point $A_2$, then move lead $a_1$ to $A_2$ and finally disconnect $a_2$ again. The resistances $R_A$, $R_B$ and $R_C$ are the limiting resistances referred to above. The same method is used for each move from $A_2$ to $A_3$, $A_3$ to $A_4$ and $A_4$ to $A_5$ and for phases B and C, using the corresponding leads $b_1$, $b_2$, $c_1$ and $c_2$. A similar sequence is used for moves in the opposite direction. It is to be understood that the above embodiments have been described by way of example only and that the invention is basically applicable to induction motors of any pole number, though possibly the most valuable application might be to high speed 2-pole motors.

We claim:
1. A poly-phase electrical inductance motor comprising; a plurality of like phase windings, each phase winding being composed of coils arranged to provide a number of pole-groups and each coil having a pitch of substantially five-sixths of full pitch, and, in the case of each phase winding, successively connected coils of the phase winding being chosen from corresponding positions in the pole groups in sequence commencing from corresponding ends of the pole-groups; tapping connections to junctions between at least some of said successively connected coils; switching means from external supply terminals arranged simultaneously to make contact with corresponding selected tapping connections in each phase winding and thereby enable like coils in each phase winding to be excluded to effect increase in speed of the motor.

2. A motor as claimed in claim 1 wherein said switching means includes a limiting resistor associated with each supply phase lead and means for bringing said limiting resistance into circuit intermediately between changes of tapping connection.

3. A three-phase electrical inductance motor comprising; three like phase windings, each phase winding being composed of coils arranged to provide two pole groups and each coil having a pitch of substantially five-sixths of full pitch, and, in the case of each phase winding, successively connected coils of the phase winding being chosen alternately from corresponding positions in the two pole groups commencing from corresponding ends of the pole groups; tapping connections to junctions between at least some of said successively connected coils; switching means from external supply terminals arranged simultaneously to make contact with corresponding selected tapping connections in each phase winding and thereby enable like coils in each phase winding to be excluded to effect increase in the speed of the motor.

References Cited by the Examiner
UNITED STATES PATENTS

| | | | |
|---|---|---|---|
| 2,436,331 | 2/1948 | Robinson | 318—224 |
| 3,118,099 | 1/1964 | Daws et al. | 318—224 |

ORIS L. RADER, *Primary Examiner.*

G. Z. RUBINSON, *Assistant Examiner.*